Patented Apr. 25, 1939

2,155,429

UNITED STATES PATENT OFFICE 2,155,429

METHOD OF MOLDING CORK PRODUCTS AND SIMILAR MATERIAL

Michael Levin, Buffalo, N. Y., assignor of four-tenths to Jacob T. Basseches, New York, N. Y.

No Drawing. Application December 23, 1931, Serial No. 582,877

11 Claims. (Cl. 18—48)

The present invention relates to improvements in a cork substitute or artificial cork, and also to a method of making such substance.

In the manufacture of artificial cork a cork base is used, such as waste cork or defective cork material reduced to granular form, the cork particles being, in the process of manufacture, first coated with a binder. The composition is then packed into molds, after which the binding material is subjected to further treatment, according to the properties thereof, so as to effect cohesion of the cork particles. In order to maintain the proper elasticity and flexibility of the cork granules, these granules have been treated heretofore with glycerine, either before the binder is mixed therewith or simultaneously with incorporating the binder therein.

Various kinds of binding materials have been employed heretofore. Some of these materials are objectionable because they impart a disagreeable odor to the cork, so that the same cannot be used as or in the manufacture of closures, when the latter are to be employed in packaging liquids or beverages for human consumption, or food stuffs in general. Other binders are objectionable because they are permeable to liquids or gases. In other cases, the binder is affected by heat and rendered to a large extent soluble, thus making the packing useless and contaminating, on the other hand, the contents of the container. These last-mentioned binders are also objectionable because they cannot be employed in manufacturing packings in general, if the latter are to be applied to machine parts or elements which are subjected to heat. Other binding materials are set or hardened by the aid of chemicals, which act upon the contents of the bottles or other containers, to which the closures are applied, thus causing the contents to be injurious to the health of the consumer.

It has been proposed heretofore to make artificial cork with the use of rubber as a binder, and a fairly good cork composition is obtained by the use of such binding material. It is objectionable, however, mainly on the ground that the solvent for the rubber imparts to the cork an objectionable odor, and also on the ground that the resulting material loses its initial elasticity and flexibility and shrinks when subjected to dry atmosphere for a continued period. Artificial cork has been made heretofore for many years with the use of albumen as a binder, which is coagulated and rendered insoluble by heat. While an inodorous product is obtained in this manner, it is not sufficiently pliable and elastic after a certain time, and does not stand boiling to which the cork material is subjected in pasteurizing the contents of the containers after filling and closing.

The binding materials heretofore used are also objectionable because they have a tendency to decay or putrefy. For this reason these materials must be prepared from day to day and made use of immediately. Still another objection to the binding materials heretofore used is that, after they have been mixed with the cork material, the material must be dried by exposing it for a considerable time to air or to low heat, to cure the composition prior to its being packed into the molds. The result is that the manufacture of the artificial cork is greatly retarded and, on the other hand, considerable space is taken up by the material while drying.

The main object of the present invention is to provide an artificial cork which is free from all of the objections above stated.

Another object of the invention is to provide a simple process for the preparation of an artificial cork, whereby the cost of production thereof is greatly reduced, thereby resulting in a comparatively inexpensive product.

With these and other objects in view, the invention consists in the composition of matter and the method of making the same hereinafter fully described and pointed out in the appended claims, it being obvious that, while herein specific proportions of the ingredients are mentioned, innumerable changes may be made within the scope of the appended claims without departing from the spirit or sacrificing any of the advantages.

The invention consists in reducing the cork or other ligneous substance to a finally divided condition of granular form, mixing with the same a binder in liquid form, said binder being adapted to be coagulated and rendered insoluble by heat, packing the composition in its wet state, into molds, and finally subjecting the composition to heat and pressure in the molds.

The cork or other ligneous substance, such as waste cork or other waste ligneous material, or such cork which is defective and of too poor quality to be used for other purposes, is granulated by any suitable means, and subjected to treatment with a view to remove the impurities therefrom. This ground cork is then bleached, if found necessary. The ground cork is then placed, for instance, into a mechanical mixing machine and the binding material hereinafter to be described fed into the same, the ingredients being thoroughly mixed so as to coat the cork particles with the binding material.

The binding material consists of rubber or like latex, with which has been mixed a preservative agent, such as ammonia, formaldehyde, etc. By the use of the term "latex" is meant any of the milky or laticiferous saps or juices obtained from trees and plants and as are contained in rubber, gutta-percha and balata, as well as including the various combined salts, minerals and other natural substances usually found therein. Latex is understood to be an emulsion or colloidal suspension of the several solid constituents in water. While all of these latices are adapted to be used as a binder, it is preferred to use rubber-containing latex obtained from the *Hevea brasiliensis*, this being the tree from which most of the rubber gathered on the Amazon and its tributaries is obtained, and is also the tree which is most exclusively cultivated in Ceylon, Federated Malay States, Straits Settlements, Sumatra and other parts of the East.

Latex may be used as a binding material, either alone or it may be mixed with other substances, such as for instance egg albumen or blood albumen, or it may be mixed with casein or other materials which are generally used as glues or cements.

If latex and albumen are used as a binding material, the ingredients of the binder are, preferably, combined in the proportions stated, viz: 30 lbs. of albumen are dissolved or swelled in 45 lbs. of water, the resilient material being added to 220 lbs. of latex, and the compound thoroughly stirred and agitated to produce a homogeneous product. As above mentioned either egg albumen or blood albumen may be used, both as found on the market as a granular product. It is preferred to use blood albumen, because it is considerably cheaper than egg albumen.

The ingredients of the artificial cork are combined, preferably, in the proportions stated, viz: To 6 lbs. of cork granules are added 3 lbs. of the binder above referred to, the ingredients being mixed as above stated until each cork particle is thoroughly coated. The material is then packed into molds, which are closed, after being filled, so as to maintain the material in the molds under pressure. The filled molds are then subjected to a temperature of 275° F. to 300° F. for about an hour, whereby the binding material is coagulated and at the same time rendered insoluble. The cork so obtained is then removed from the molds, and cut into pieces of the proper dimensions.

It is to be observed that the effect of the heat upon the mass is to render the liquid ingredients of the composition impermeable to liquids and gases, and also insoluble, the pressure serving to produce a non-porous body, the binding material filling completely the interstices between the cork or other ligneous granules. Owing to the low cost of the ingredients and the simple process, a comparatively inexpensive product is obtained, which successfully competes with natural cork, in fact it has properties which are absent in natural cork, such as elasticity and flexibility under normal conditions for any length of time. The product does not disintegrate and is not affected by boiling. It is tasteless and inodorous, and has ample elasticity and tenacity.

Actual experiments have shown that the ammonia in the latex acts on the albumen by causing it to go easily into the solution. The albumen, on the other hand, has an emulsifying action on the latex, preventing it from drying up rapidly. The binder may be prepared and left to stand for several days without putrefying or decomposing action setting in. The binder is of such nature that the cork granules mixed therewith may be packed into molds in any weather, even hot and muggy weather.

As stated above, blood albumen may be used in preparing the binding material without any objectionable or detrimental effect on containers in which food products are packed. It has been found the cheapest grade of blood albumen can be used and yet the binder will be free from the ordinary objectionable dark color of such a product, the ammoniated latex having a bleaching effect on the blood albumen.

As appears from the foregoing, the use of glycerine is eliminated in obtaining the product. Still the product has the desired characteristics of non-hardening and retains the elasticity and does not shrink. The product may be kept in boiling water for a considerable time without disintegration.

It is also possible to first mix the cork granules with albumen dissolved or swelled in water, or with a casein solution, or any other suitable glue or cement, then dry the cork and add the latex which has been preserved with any of the well known preserving agents. In these cases the cork may have been first treated with glycerine or it may be compounded in its natural state.

Instead of latex, water dispersions of rubber may be used in compounding the artificial cork.

If found necessary, to any one of the compositions above described, a vulcanizing agent and an accelerator may be added, and if necessary an activator for the accelerator may be put into the compound. Sulphur may be used, for instance, as a vulcanizing agent, and zinc oxide as an activator for the accelerator. Preferably, organic accelerators are employed.

By "latex", as used in the claims, is meant the juices of plants producing rubber, gutta-percha or balata, and also water dispersions of rubber.

Though I have above referred to cork as the preferred granulated product to be used by the method outlined by me, under certain conditions, I may, with a certain degree of success, substitute in whole or in part, other fibrous and pithy vegetable products for the cork. Thus, in accordance with another embodiment of my invention, I may substitute in whole or in part for the cork, such granular vegetable particles as are obtained from the waste products in treating cane sugar stalks, including the fibrous and pithy part obtained after the sugar has been extracted, and also the scrap or sawdust made from products using the fibrous and pithy part of corn stalks, such as the waste product and sawdust from boards made of this material, which is a product known on the market as Celotex. In making such substitution in whole or in part for cork, I may also use corn stalks after the ears have been removed, and this source may also include the leaves of corn stalks. Other granular vegetable substances may also include oats, wheat and rye, the hulls or the oats, wheat or rye, including the hulls which are not utilized for purposes of preparing food products. These vegetable products, though lacking the resiliency of cork, respond to some extent to the methods heretofore described in connection with the preferred ingredient mentioned, to wit, cork.

Though I have described latex with or without the proteins, inclding egg albumen, or blood albumen, or casein, as the preferred binding ingredient, and have stated that I mean to include thereby, water dispersions of rubber, it is contemplated by me to utilize the water dispersions of rubber described in my prior applications, S. N. 78,335 now Patent No. 1,852,532, granted April 5, 1932, and 102,049, also the continuation of this last mentioned application, S. N. 578,198.

In the practice of my invention for the embodiment just described, I prefer to take the cane sugar stalks or the waste products made from cane sugar stalks, after the sugar has been extracted, including the sawdust made into boards of this vegetable fibre, such as Celotex waste or Celotex sawdust, where this vegetable material is substituted in whole for the granulated cork, and prepare it as follows:

To 1½ pounds ground extracted cane sugar stalks or sawdust, or ground Celotex board, there is added as a binder, in accordance with the method herein described, 225 grams of an aqueous dispersion of the character previously referred to. Preferably, the aqueous dispersion is one made in the proportions as follows:

100 grams black blood albumen dissolved in 500 grams of water, and
100 grams of latex (25 to 35% rubber solids is preferred), though one stabilized to include as high as 60% solids may also be used.

The vegetable fibrous material and binder just described are mixed in accordance with the methods previously described, in a mixer. When uniformity of the mixture has been obtained, the product is pressed into a mold into the form desired, such as a board, and heated to about 290 degrees F. under about 40 pounds pressure, held in the mold from 10 to 30 minutes, and then the board relieved from pressure by removal from the mold. I may also first press and mold the mixture of granular vegetable material with its binder, whether cork or the material which may be substituted in whole or in part for cork is used, in a mold, to give the same the proper configuration, and then the molded board thus formed is conveyed to an oven where coagulation and vulcanization of the binder is effected, preferably at about the temperature just described.

In another embodiment of my invention, it is preferred by me to utilize with cellulosic materials, such as corn stalks, cane stalks, shells from various seeds, such as cocoa, wheat and wheat straw, and the other granular vegetable particles herein enumerated, percentages of elastic, ligneous material, such as the bark of trees of which cork is preferred. Under the procedure herein previously described and subsequently referred to, it is preferred by me to include, with cellulosic particles of the character referred to, about 1% by weight of particles of the elastic ligneous material referred to, the cellulosic particles, such as corn stalks, cane stalks, and the waste sawdust of boards made from cane stalks, after recovering the sugar, constituting 99% by weight, and the elastic ligneous material constituting about 1%. The mass so prepared, after intimate mixture of the cellulosic material and cork, is mixed with the binder of the character previously referred to, to form an intimate mixture without coagulation of the latex, or rubber dispersion, and the dispersing agent associated with the latex, or rubber dispersion. The mixture of albuminous material and latex or rubber dispersion, and the granular material after uniform distribution may then be packed in its wet state and submitted to pressure, and subsequently, as in the preferred form of my invention, proceed to coagulation of the latex and albuminous material, where these are used, preferably by heating under conditions already enumerated.

The inclusion of the elastic ligneous material, such as bark of trees, preferably cork, permits the application of the pressure in molding to cause the mixture to be sufficiently deformed to more evenly distribute the binder between the interstices of the particles. The inclusion of the albuminous material in the rubber dispersion or latex, permits of a uniform distribution of the binder during the molding operation, and the resiliency, particularly where including the percentages of cork, as described, further facilitating the distribution of the binder into the interstitial spaces of the vegetable particles to be united or for the uniting process where this is accomplished in accordance with the embodiment of the invention which will be further herein described.

As another embodiment of my invention, the mass of cork and its binder, with or without additions of the other granulated vegetable particles mentioned, or these granulated vegetable particles, without the cork, is pressed into a mold which has enclosed some previously formed sheeted material, such as a sheet of metal, a sheet of paper, cloth, fabric, sheet rubber or wood. The molding or pressing operation of this loose mass is in conjunction with this previously formed sheet. The molding operation, in accordance with the methods described under this procedure, serves to simultaneously unite the mass to the sheet, as the excess binder admirably serves to unite either metal, rubber, wood, cloth fabric, or paper, to the mass of granulated vegetable particles, including cork, substituted in whole or in part by the other vegetable particles mentioned.

The molding operation, under this procedure, serves to unite the granular particles as well as uniting this mass to the sheeted material.

The molding operation, under this procedure, also contemplates the coagulation by heat, as previously described. Where making a composite article of this character, sheets of wood, paper, metal, rubber or artificial wood, may be united to one or both faces of the mass, comprising granulated cork, substituted in whole or in part, by the other granulated vegetable particles mentioned, and the binder, comprising latex or aqueous dispersions of rubber, in accordance with the materials previously described. This application is a continuation-in-part of my application Serial No. 187,118, filed April 27, 1927.

Having thus described my invention and illustrated its use, what I claim as new and desire to secure by Letters Patent, is—

1. The method of making a formed artificial cork which comprises mixing a granular cork base with a fluid binding material including dispersed rubber and a heat irreversible albumen taken from the group consisting of egg albumen and blood albumen, packing the mass into a mold in the wet state, heating to form a self-sustaining mass and to coagulate the albumen and coalesce the dispersed rubber and render the entire mass non-reactive to aqueous vehicles.

2. The method of making a composition of granulated cork and latex, which consists in mixing the granulated cork with the latex without coagulation, subjecting the mixture to pressure while coagulation of the latex proceeds, and subsequently relieving the mixture of pressure.

3. The method of forming a formed product of the character herein referred to, which comprises mixing a resilient ligneous material with cellulosic vegetable particles with a fluid binding material, including dispersed rubber and a heat coagulable, irreversibly responsive albumen of the group consisting of egg albumen and blood albumen, packing the mass so prepared in a wet state, heating to form a self sustaining mass and to coagulate the albumen and coalesce the dispersed rubber and render the entire mass non-reactive to aqueous vehicles.

4. The method of forming a molded product of the character herein referred to, which comprises mixing a resilient, ligneous material comprising cork with cellulosic vegetable particles in the proportion of about 1% by weight cork, and about 99% by weight cellulosic vegetable particles, mixing with the particles so prepared an aqueous dispersion of rubber and a stabilizing ingredient, comprising albumen, packing the mass in its wet state into a mold without coagulation of the ingredients constituting the binder, subjecting the mixture to pressure while coagulation of the binder proceeds, and subsequently relieving the pressure.

5. The method of making a formed product of the character herein referred to, which comprises intimately mixing cellulosic vegetable particles with an aqueous dispersion of rubber, including blood albumen, without coagulation of the binder constituting the aqueous dispersion of rubber and blood albumen, subjecting the mixture in its wet state to pressure, in contact with a sheeted material while coalescence and coagulation of the binder proceeds and then further treating the composite to consolidate the cellulosic vegetable particles and unite the same to the sheeted material.

6. The method of forming a formed product of the character herein referred to, which comprises intimately mixing particles including a quantity of cork with a fluid binding material comprising an aqueous dispersion of rubber and a heat coagulable irreversibly responsive stabilizing agent for the dispersion of rubber, said stabilizing agent comprising albumen taken from the group consisting of egg albumen, blood albumen, packing the mass so prepared in a wet state, in contact with a sheeted material and then heating to form a self-sustaining mass to coalesce and coagulate the binder and unite said mass to said sheeted material.

7. The method of forming a formed product of the character herein referred to, which comprises mixing cellulosic particles with a binder comprising an aqueous dispersion of rubber, including blood albumen, together with sulphur as a vulcanizing agent and zinc oxide as an activator, packing the mass so prepared in a wet state to form a self-sustaining mass while coagulation and coalescence of the binder proceeds, and heating the mass to heat irreversibly coagulate the binder.

8. The method of forming a molded product of the character herein referred to, which comprises mixing with cellulosic particles, a binding material, comprising an aqueous dispersion of rubber, including blood albumen, a vulcanizing agent and an activator, comprising zinc oxide, packing the mass so prepared in its wet state in a mold, and subjecting the same to pressure in contact with a sheeted material and forming a self-sustaining mass and uniting said mass to the sheeted material by heating the same.

9. The method of forming a moldable product of an aggregate filler and an adhesive, the steps which include mixing an adhesive comprising an albuminous substance in a state of aqueous solution and an aqueous dispersion of a normally inaqueous, water resisting, flexible, rubber-like gum colloid, with the aggregate filler and then submitting the mixture to dehydrating conditions and insolubilizing the adhesive.

10. The method of forming a moldable product of an aggregate filler and an adhesive, the steps which include mixing an adhesive comprising blood albumen in a state of aqueous solution, an aqueous dispersion of a normally inaqueous, water resisting, flexible, rubber-like gum colloid and formaldehyde with the aggregate filler and then submitting the mixture to dehydrating conditions and insolubilizing the adhesive.

11. The method of uniting materials with an adhesive, the steps which include mixing an adhesive comprising an albuminous substance in the state of aqueous solution and an aqueous dispersion of rubber, and with the materials to be united, and then submitting the composite to dehydrating conditions and insolubilizing the adhesive.

MICHAEL LEVIN.